US010179602B2

United States Patent
Kudo et al.

(10) Patent No.: US 10,179,602 B2
(45) Date of Patent: Jan. 15, 2019

(54) DRIVER ASSISTANCE SYSTEM FOR VEHICLE

(71) Applicant: TOYOTA JIDOSHA KABUSHIKI KAISHA, Toyota-shi, Aichi-ken (JP)

(72) Inventors: Yoshio Kudo, Machida (JP); Yoji Kunihiro, Susono (JP); Ryo Irie, Okazaki (JP); Satoru Yabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/810,702

(22) Filed: Nov. 13, 2017

(65) Prior Publication Data

US 2018/0201307 A1 Jul. 19, 2018

(30) Foreign Application Priority Data

Jan. 13, 2017 (JP) .................................. 2017-004494

(51) Int. Cl.
*B62D 6/00* (2006.01)
*B62D 5/04* (2006.01)
*B62D 6/10* (2006.01)
*B62D 1/28* (2006.01)
*B62D 15/02* (2006.01)

(52) U.S. Cl.
CPC .............. *B62D 5/0463* (2013.01); *B62D 1/28* (2013.01); *B62D 1/286* (2013.01); *B62D 5/04* (2013.01); *B62D 6/00* (2013.01); *B62D 6/10* (2013.01); *B62D 15/02* (2013.01); *B62D 15/025* (2013.01)

(58) Field of Classification Search
CPC .... B62D 5/0463; B62D 15/025; B62D 15/02; B62D 5/04; B62D 1/28; B62D 6/00; B62D 1/286; B62D 6/10
USPC ................. 701/41, 42, 44, 48, 118; 340/435
See application file for complete search history.

(56) References Cited

U.S. PATENT DOCUMENTS

| | | | |
|---|---|---|---|
| 2007/0021889 A1* | 1/2007 | Tsuchiya | B62D 1/286 |
| | | | 701/41 |
| 2007/0043490 A1* | 2/2007 | Yokota | B62D 5/046 |
| | | | 701/41 |

(Continued)

FOREIGN PATENT DOCUMENTS

| | | |
|---|---|---|
| JP | 2007-030612 A | 2/2007 |
| JP | 2015-033942 A | 2/2015 |

*Primary Examiner* — Shardul D Patel
(74) *Attorney, Agent, or Firm* — Oliff PLC

(57) ABSTRACT

When a steering intervention of the driver is performed during automated steering control, a driver assistance system for a vehicle determines a P control amount based on a non-linear characteristics and calculates an I control amount using a coefficient according to a characteristics (solid line). In an angle difference range R1, the P control amount based on the non-linear characteristics is determined such that the amount of increase of absolute value of the P control amount with respect to the amount of increase of absolute value of the angle difference becomes smaller as compared to a linear characteristics. The coefficient with the characteristics (solid line) indicates 1 in the angle difference range R1, and approaches zero when the absolute value of the angle difference is greater in an angle difference range R2. To calculate the I control amount, the coefficient is multiplied by the current value of the angle difference.

5 Claims, 6 Drawing Sheets

(56) References Cited

U.S. PATENT DOCUMENTS

| | | | |
|---|---|---|---|
| 2008/0021612 A1* | 1/2008 | Sakuma | B62D 5/008 |
| | | | 701/41 |
| 2008/0243339 A1* | 10/2008 | Nishimori | B60G 7/003 |
| | | | 701/41 |
| 2013/0304327 A1* | 11/2013 | Morishita | B62D 5/0463 |
| | | | 701/43 |
| 2015/0066241 A1* | 3/2015 | Akiyama | B60W 10/18 |
| | | | 701/1 |
| 2017/0088174 A1* | 3/2017 | Inoue | B60T 8/1755 |
| 2017/0327150 A1* | 11/2017 | Kim | B62D 5/0463 |

* cited by examiner

DRIVER ASSISTANCE SYSTEM FOR VEHICLE

CROSS-REFERENCE TO RELATED APPLICATION

This application is based on and claims the benefit of Japanese Patent Application No. 2017-004494, filed on Jan. 13, 2017, which is incorporated by reference herein in its entirety.

BACKGROUND

Technical Field

The present disclosure relates to a driver assistance system for a vehicle, and more particularly to a driver assistance system for a vehicle that controls a steering angle of a wheel by the use of an electric power steering device.

Background Art

JP 2007-030612 A discloses an electric power steering (EPS) device that performs a lane keeping assist control. This EPS device calculates a base assist torque used to assist a steering operation by a driver of the vehicle. Moreover, the EPS device calculates a lane keeping assist torque for the vehicle to run at a certain position in a driving lane. In more detail, the lane keeping assist torque is calculated by performing PID control on the basis of a difference between an offset of the vehicle with respect to a driving path and a target offset, and on the basis of a difference between a yaw angle and a target yaw angle. Moreover, in order to improve the steering feeling during the lane keeping assist control, the EPS device corrects a compensating torque (a compensating control amount) for compensating the basic assist torque (a basic assist control amount) in accordance with the lane keeping assist torque (a lane keeping assist control amount).

In addition to JP 2007-030612 A, JP 2015-033942 A is a patent document which may be related to the present disclosure.

SUMMARY

The lane keeping assist control disclosed in JP 2007-030612 A corresponds to an example of "automated steering control" that controls an electric motor of an electric power steering device so as to generate a steering torque for causing an actual steering angle of the wheels to approach a target steering angle. During execution of the automated steering control, a situation is assumed where a steering intervention of the driver is performed. According to the automated steering control disclosed in JP 2007-030612 A, when a deviation of the actual driving path with respect to a target driving path (that is, the deviation of the actual steering angle of the wheels with respect to the target steering angle) becomes greater due to the steering operation by the driver in this kind of situation, the difference of the PID control described above becomes greater. As a result, a calculation value of the lane keeping assist torque for keeping the target driving path becomes greater. A guard value for ensuring that the control amount does not become extremely too large is generally provided for the control amount of the PID control. if the control amount of the steering torque (in JP 2007-030612 A, the lane keeping assist torque) reaches its guard value during an angle difference between the target steering angle and the actual steering angle increasing due to a steering intervention of the driver, an increase of the control amount is limited. If the characteristics of the control amount with respect to the angle difference is not proper, there is the possibility that the control amount may change rapidly when it reaches the guard value. If a rapid change of the control amount occurs, there is a concern that the driver may feel uncomfortable about his/her operation of the steering wheel.

Based on the above, it can be said that it is favorable that the characteristics of the control amount of the steering torque with respect to the angle difference between the target steering angle and the actual steering angle is properly determined so as to be able to reduce a rapid change when a steering intervention of the driver is performed during execution of the automated steering control. On the other hand, there is the possibility that, during execution of the automated steering control, the angle difference may increase due to some sort of disturbance (for example, that the vehicle is in a crosswind) even if a steering intervention of the driver is not performed. Thus, it is favorable that the characteristics of control amount of the steering torque with respect to the angle difference is determined while easily ensuring the compliance of the actual steering angle with respect to the target steering angle when the angle difference becomes too large due to a disturbance.

The present disclosure has been made to address the problem described above, and an object of the present disclosure is to provide a driver assistance system for a vehicle that can prevent a rapid change of a control amount of the steering torque by automated steering control when a steering intervention of the driver is performed while preventing a decrease of the compliance of an actual steering angle with respect to a target steering angle due to a disturbance during execution of the automated steering control using an electric power steering device.

A driver assistance system for a vehicle according to the present disclosure is applied to the vehicle including an electric power steering device equipped with an electric motor that is driven to control a steering angle of a wheel.

The driver assistance system is configured to perform automated steering control that controls the electric motor so as to generate a steering torque for causing an actual steering angle of the wheel to approach a target steering angle.

A control amount of the steering torque used for causing the actual steering angle to approach the target steering angle in the automated steering control includes a proportional term based on an angle difference between the target steering angle and the actual steering angle and an integral term based on an integral value of the angle difference.

The driver assistance system is configured, when a steering intervention of the driver is not performed during the automated steering control, to perform determination of the proportional term based on a first proportional term characteristics and calculation of the integral term based on a first integral term characteristics.

In the first proportional term characteristics, the proportional term is determined such that, within a range that does not exceed a proportional term guard value, an absolute value of the proportional term becomes greater when an absolute value of the angle difference is greater.

The integral term based on the first integral term characteristics is calculated based on the integral value calculated without correction of a current value of the angle difference within a range that does not exceed an integral term guard value.

The driver assistance system is configured, when a steering intervention of the driver is performed during the automated steering control, to perform at least one of determination of the proportional term based on a second proportional term characteristics used instead of the first proportional term characteristics and calculation of the integral term based on a second integral term characteristics used instead of the first integral term characteristics.

In a large-angle-difference range in which the absolute value of the angle difference is greater than or equal to an angle difference threshold value, the proportional term based on the second proportional term characteristics is determined such that, within a range that does not exceed the proportional term guard value, an amount of increase of the absolute value of the proportional term with respect to an amount of increase of the absolute value of the angle difference becomes smaller than that of the proportional term based on the first proportional term characteristics.

Within a range that does not exceed the integral term guard value, the integral term based on the second integral term characteristics is calculated based on the integral value calculated while multiplying the current value of the angle difference by a coefficient, the coefficient indicating 1 in a small-angle-difference range in which the absolute value of the angle difference is smaller than the angle difference threshold value and approaching zero when the absolute value of the angle difference is greater in the large-angle-difference range.

The driver assistance system may be configured to:
select the second proportional term characteristics when an absolute value of a steering torque applied to a steering wheel by the driver increases so as to be greater than or equal to a first threshold value during the automated steering control; and
select the first proportional term characteristics when the absolute value of the steering torque applied to the steering wheel by the driver decreases so as to be smaller than or equal to a second threshold value that is smaller than the first threshold value during the automated steering control.

The driver assistance system may be configured to:
select the second proportional term characteristics when an absolute value of a steering torque applied to a steering wheel by the driver increases so as to be greater than or equal to a first threshold value during the automated steering control; and
select the first proportional term characteristics when the absolute value of the angle difference transitions from the large-angle-difference range to the small-angle-difference range during the automated steering control.

The driver assistance system may be configured to:
select the second integral term characteristics when an absolute value of a steering torque applied to a steering wheel by the driver increases so as to be greater than or equal to a first threshold value during the automated steering control; and
select the first integral term characteristics when the absolute value of the steering torque applied to the steering wheel by the driver decreases so as to be smaller than or equal to a second threshold value that is smaller than the first threshold value during the automated steering control.

The driver assistance system may be configured to:
select the second integral term characteristics when an absolute value of a steering torque applied to a steering wheel by the driver increases so as to be greater than or equal to a first threshold value during the automated steering control; and
select the first integral term characteristics when the absolute value of the angle difference transitions from the large-angle-difference range to the small-angle-difference range during the automated steering control.

According to the driver assistance system for a vehicle of the present disclosure, at least one of the proportional term and the integral term of the steering control amount is determined during execution of the automated steering control by the use of the characteristics that are different depending on the presence or absence of a steering intervention of the driver.

To be more specific, if the second proportional term characteristics is used when a steering intervention is performed, the proportional term is determined such that an amount of increase of the absolute value of the proportional term with respect to an amount of increase of the absolute value of the angle difference becomes smaller than that of the proportional term based on the first proportional term characteristics used when the steering intervention is not performed, in the large-angle-difference range in which the absolute value of the angle difference is greater than or equal to an angle difference threshold value. According to this kind of second proportional term characteristics, the amount of increase of the absolute value of the proportional term with respect to the amount of increase of absolute value of the angle difference can be slowed in the vicinity of the proportional term guard value as compared to that when the linear characteristics is used. Thus, a rapid change of the proportional term can be prevented from occurring in the vicinity of the proportional term guard value when a steering intervention of the driver is performed. On the other hand, when a steering intervention of the driver is not performed, the first proportional term characteristics is used. Thus, even if the angle difference increases due to a disturbance, the compliance of the actual steering angle with respect to the target steering angle can be easy to be properly ensured.

Moreover, if the second integral term characteristics is used when a steering intervention is performed, the integral term is calculated based on the integral value calculated while multiplying the current value of the angle difference by the coefficient that indicates 1 in the small-angle-difference range in which the absolute value of the angle difference is smaller than the angle difference threshold value and that approaches zero when the absolute value of the angle difference is greater in the large-angle-difference range. In contrast to this, according to the first integral term characteristics, the integral term is calculated based on the integral value calculated without correction of the current value of the angle difference. Thus, according to the second integral term characteristics, a time change of the integral term can be slowed in the vicinity of the integral term guard value as compared to when the first integral term characteristics is used. Consequently, a rapid change of the integral term can be prevented from occurring in the vicinity of the integral term guard value when a steering intervention of the driver is performed. On the other hand, when a steering intervention of the driver is not performed, the first integral term characteristics is used. Thus, even if the angle difference increases due to a disturbance, the compliance of the actual steering angle with respect to the target steering angle can be easy to be properly ensured.

Based on the above, according to the driver assistance system of the present disclosure, when a steering intervention of the driver is performed, a rapid change of the control amount of the steering torque by the automated steering control can be prevented from occurring while preventing a decrease of the compliance of the actual steering angle with respect to the target steering angle due to a disturbance during execution of the automated steering control.

DETAILED DESCRIPTION

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

First, a first embodiment of the present disclosure will be described with reference to FIGS. 1 to 4.
[Example of Configuration of Vehicle Equipped with Driver Assistance System]

Figure 1:
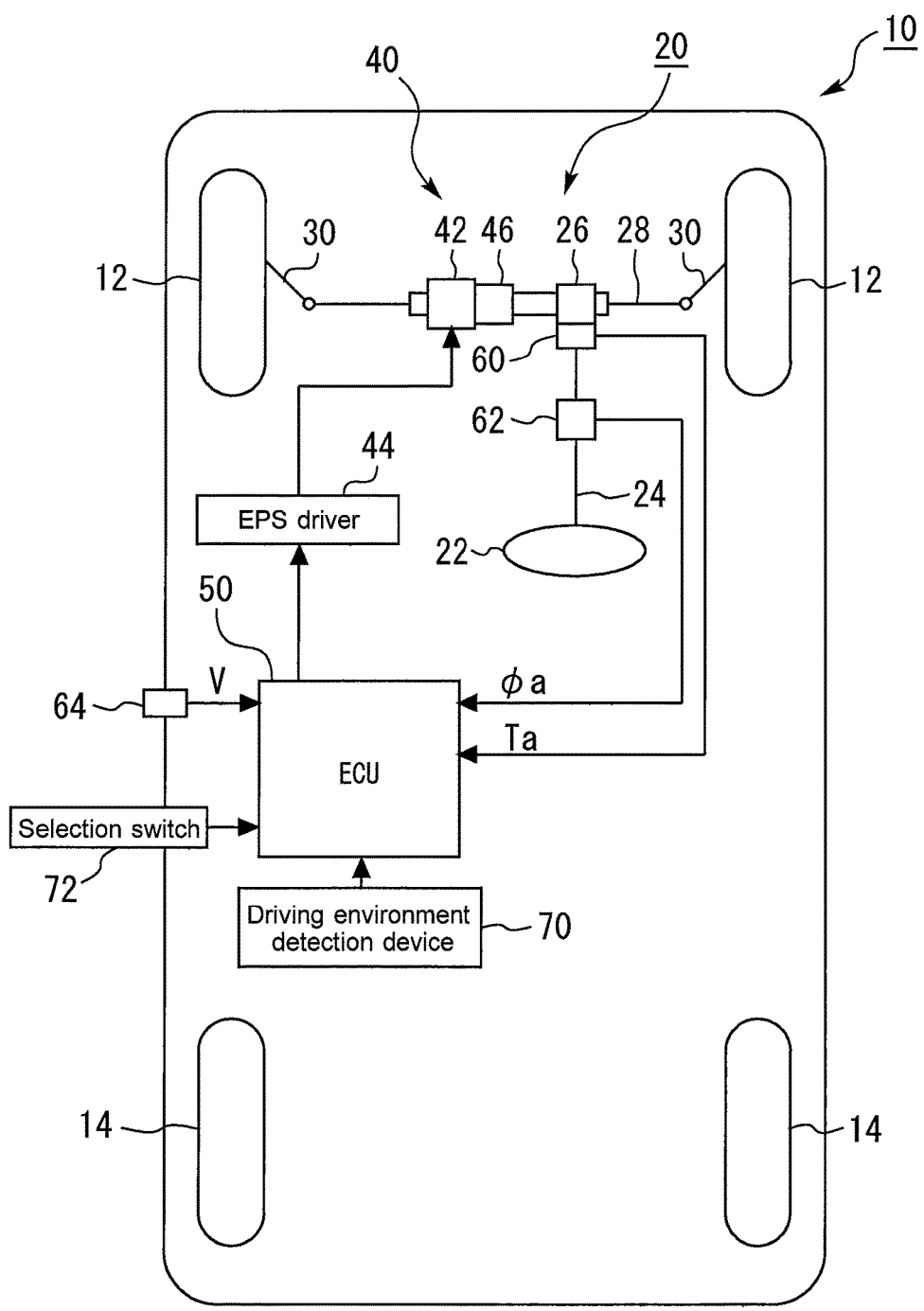
FIG. 1 is a schematic diagram that illustrates a configuration example of a vehicle to which a driver assistance system according to a first embodiment of the present disclosure is applied.

FIG. 1 is a schematic diagram that illustrates a configuration example of a vehicle 10 to which the driver assistance system according to a first embodiment of the present disclosure is applied. As shown in FIG. 1, the vehicle 10 is equipped with two front wheels 12 and two rear wheels 14.

The vehicle 10 is provided with a steering device 20. The steering device 20 is used to turn the two front wheels 12. More specifically, the steering device 20 includes a steering wheel 22, a steering shaft 24, a pinion gear 26, a rack bar 28, tie rods 30 and an electric power steering device (hereafter, referred to as an "EPS (Electric Power Steering) device") 40. It should be noted that the driver assistance system according to the present embodiment can also be applied to an example of 4WS (Four Wheel Steering) vehicle in which both the front wheels 12 and the rear wheels 14 are steered.

The steering wheel 22 is used for a steering operation by the driver. That is, the driver turns the steering wheel 22 when the driver wants to turn the front wheels 12. One end of the steering shaft 24 is connected to the steering wheel 22.

The other end of the steering shaft 24 is connected to the pinion gear 26. The pinion gear 26 is engaged with the rack bar 28. Both ends of the rack bar 28 are respectively connected to the left and right front wheels 12 through the tie rods 30. The rotation of the steering wheel 22 is transmitted to the pinion gear 26 through the steering shaft 24. The rotational motion of the pinion gear 26 is converted into a linear motion of the rack bar 28, and thereby the steering angle of the front wheels 12 changes.

The EPS device 40 is a device for generating a force to turn the front wheels 12. To be more specific, the EPS device 40 is equipped with an electric motor 42 and an EPS driver 44. As an example, the electric motor 52 is connected to the rack bar 28 with a conversion mechanism 46 interposed therebetween. The conversion mechanism 46 is a ball screw, for example. When a rotor of the electric motor 42 rotates, the conversion mechanism 46 converts the rotational motion into a linear motion of the rack bar 28, and thereby the steering angle of the front wheels 12 changes.

The EPS driver 44 is a device for driving the electric motor 42, and includes an inverter. The inverter converts a DC power supplied from a DC power source (not shown) to an AC power and supplies the AC power to the electric motor 42 to drive the electric motor 42. With the EPS driver 44 controlling the rotation of the electric motor 42, it is possible to turn the front wheels 12. This operation of the EPS driver 44, that is, the operation of the EPS device 40 is controlled by an ECU 50 described below. Details of the control of the EPS device 40 by the ECU 50 will be described later.

The ECU (Electronic Control Unit) 50 is mounted in the vehicle 10. Various sensors for detecting a variety of state quantities of the vehicle 10 are electrically connected to the ECU 50. The various sensors mentioned here include a steering torque sensor 60, a steering angle sensor 62 and a vehicle speed sensor 64, for example.

The steering torque sensor 60 detects a steering torque Ta applied to the steering shaft 24. The steering torque sensor 60 outputs a steering torque signal depending on the steering torque Ta to the ECU 50. In addition, the value of the steering torque Ta becomes positive or negative due to a difference of the steering direction of the steering wheel 22.

The steering angle sensor 62 detects a rotation angle φa of the steering shaft 24. This rotation angle φa is the same as the steering angle of the steering wheel 22. The steering angle sensor 62 outputs a steering angle signal depending on the rotation angle φa to the ECU 50. There is a correlation between the steering angle of the steering wheel 22 and the steering angle of the front wheels 12. Thus, by setting a relationship therebetween in advance, an actual steering angle θa of the front wheels 12 can be calculated as a value depending on the rotation angle φa that is detected by the steering angle sensor 62. In addition, the values of the steering angle (the rotation angle φa) of the steering wheel 22 and the actual steering angle θa that is correlated to the rotation angle φa become positive or negative due to a difference of the steering direction of the steering wheel 22.

The vehicle speed sensor 64 detects a vehicle speed V that is the speed of the vehicle 10 to output a detected vehicle speed signal depending on the vehicle speed V to the ECU 50.

Moreover, a driving environment detection device 70 is mounted in the vehicle 10. In automated driving control of the vehicle 10 described later, the driving environment detection device 70 acquires "driving environment information" used for detection of a driving lane in which the vehicle 10 is traveling. First, the driving environment information is exemplified by a surrounding target information regarding a target around the vehicle 10. The surrounding target includes a moving target and a stationary target. The moving target is exemplified by a surrounding vehicle and a pedestrian. Information on the moving target includes a position and a speed of the moving target. The stationary target is exemplified by a roadside structure and a white line. Information on the stationary target includes a position of the stationary target.

In order to detect the surrounding target information, the driving environment detection device 70 is provided with a stereo camera that images a situation around the vehicle 10, for example. An image imaged by the stereo camera is sequentially sent to the ECU 50 as an image data. The ECU 50 performs an image processing for a sent image data. As a result, the ECU 50 can detect a driving lane of the vehicle 10 based on a white line included in the image data. It should be noted that, in order to detect the surrounding target information, at least one of a LIDAR (Laser Imaging Detection and Ranging) and a millimeter-wave radar may be, for example, used instead of the stereo camera or along therewith. The LIDAR uses laser lights to detect a target around the vehicle 10. The millimeter-wave radar uses radio waves to detect a target around the vehicle 10.

Moreover, in order to detect the driving lane of the vehicle 10, a position-orientation information of the vehicle 10 may also be used as the driving environment information, instead of the surrounding target information or along therewith. The position-orientation information can be, for example, acquired by means of a GPS (Global Positioning System) device. The GPS device receives signals transmitted from a plurality of GPS satellites and calculates a position and a posture (i.e. orientation) of the vehicle 10 based on the received signals. The GPS device sends the calculated position-orientation information to the ECU 50.

The driving environment information for the automated driving control may further include a lane information and an infrastructure provided information, for example. In order to automatically perform a lane change, the driving environment detection device 70 may also include a map database for acquiring the lane information and a communication device for acquiring the infrastructure provided information. Lane information indicating a geometry of each lane on a map is recorded in the map database. Based on the map database and a position of the vehicle 10, it is possible to acquire the lane information around the vehicle 10. The communication device acquires an infrastructure provided information from an information provision system. The infrastructure provided information is exemplified by a traffic information, a roadwork section information, and so forth. In an example in which the communication device is provided, the communication device sends this kind of infrastructure provided information to the ECU 50. A target steering angle θt described later may be calculated with taking into consideration at least one of this kind of lane information and infrastructure provided information.

Furthermore, the vehicle 10 is equipped with a selection switch 72 for the driver to select ON/OFF of the automated driving control.

The ECU 50 includes a processor, a memory, and an input/output interface. The input/output interface receives sensor signals of the various sensors described above and the driving environment information from the driving environment detection device 70. Also, the input/output interface receives, from the selection switch 72, a request concerning the execution of the automated driving control from the driver.

Figure 2:
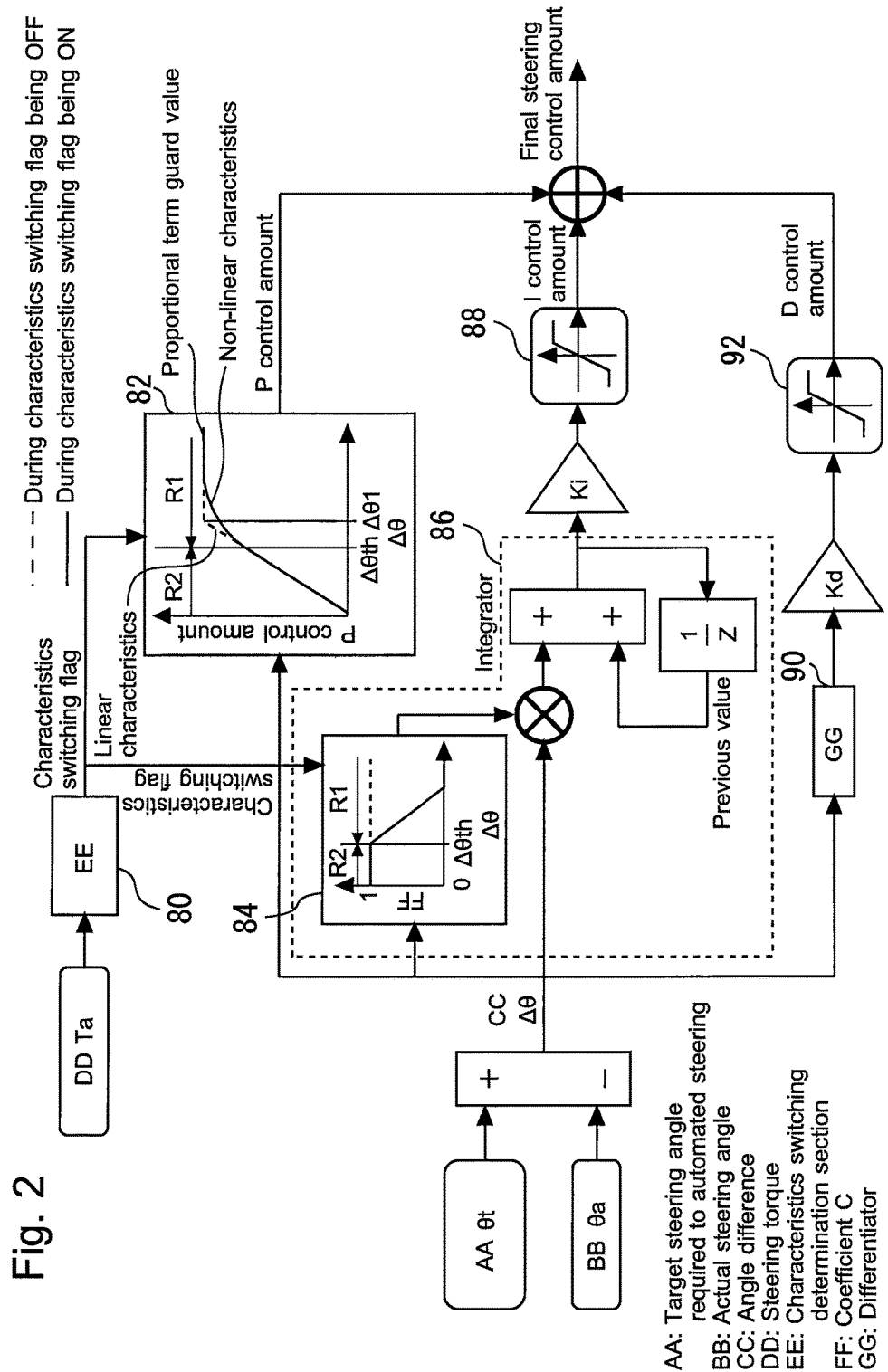
FIG. 2 is a block diagram that illustrates the outline of automated steering control performed by an ECU.

The ECU 50 performs various driving controls concerning the driving of the vehicle 10. In detail, the driving controls performed by the ECU 50 include steering control of the front wheels 12 and automated driving control. These controls are performed on the basis of the detected information from the various sensors described above, the driving environment information of the driving environment detection device 70 and the operation information of the selection switch 72. In more detail, the function blocks shown in FIG. 2 are achieved by the processor of the ECU 50 executing control programs stored in the memory.

More specifically, the automated driving control includes automated steering control that automatically performs the steering operation of the front wheels 12 by the use of the EPS device 40 and automated acceleration/deceleration control regarding the acceleration and deceleration of the vehicle 10. Also, as the steering control of the front wheels 12, the ECU 50 performs steering torque assist control that assists a steering operation by the driver during non-execution of the automated driving control. In this way, the steering control of the front wheels 12 includes the steering torque assist control and the automated steering control. In addition, the ECU 50 which performs the automated steering control on the basis of information inputted from the various sensors, such as the steering torque sensor 60 and the steering angle sensor 62, and information inputted from the driving environment detection device 70 and the selection switch 72 corresponds to the driver assistance system according to the present embodiment. Moreover, in the present embodiment, the automated acceleration/deceleration control may be performed in an arbitrary manner in accordance with a known method.

[Steering Control According to First Embodiment]

1. Steering Torque Assist Control (Steering Control during Non-Execution of Automated Driving)

While the selection switch 72 is turned OFF (that is, during non-execution of the automated driving), a driving entity is the driver, and the driver operates the steering wheel 22. That is, the steering angle of the front wheels 12 is determined by the driver's operation.

According to the steering torque assist control, the ECU 50 receives a steering torque signal from the steering torque sensor 60. The ECU 50 calculates an assist torque on the basis of a steering torque Ta and controls the EPS driver 44 such that the assist torque is obtained.

For example, the ECU 50 has a torque map indicating a relationship between an input parameter and the assist torque. The input parameter includes the steering torque Ta detected by the steering torque sensor 60. The input parameter may further include the vehicle speed V detected by the vehicle speed sensor 64. The torque map is determined in advance in consideration of desired assist characteristics. In response to an operation of the steering wheel 22 by the driver, the ECU 50 refers to the torque map to calculate the assist torque according to the input parameter.

Then, the ECU 50 calculates a target electric current command value according to the assist torque and outputs the target electric current command value to the EPS driver 44. The EPS driver 44 drives (actuates) the electric motor 42 in accordance with the target electric current command value. A rotational torque (i.e. the assist torque) of the electric motor 42 is transmitted to the rack bar 28 through the conversion mechanism 46. As a result, turning of the front wheels 12 is assisted and thus the driver's steering load is reduced.

2. Automated Steering Control (Steering Control during Automated Driving)

While the selection switch 72 is turned ON (that is, during execution of the automated driving), the driving entity including the steering operation shifts from the driver to the automated driving system. Additionally, although the automated steering control allows an intervention of the driver with respect to the steering operation, the automated steering control is basically performed without the need of the steering operation by the driver.

The ECU 50 automatically controls the steering angle of the front wheels 12 by the use of the EPS device 40. That is, the EPS device 40 used for the "steering torque assist control" during non-execution of the automated driving is used for the "automated steering control" during execution of the automated driving.

FIG. 2 is a block diagram that illustrates the outline of the automated steering control performed by the ECU 50.

2-1. Calculation of Target Steering Angle θt

According to the automated steering control, the actual steering angle θa of the vehicle 10 is controlled such that the vehicle 10 travels along a target path (a target line). The target path can be determined as a driving path located near the center of a driving lane that is detected based on the image data from the stereo camera of the driving environment detection device 70. The ECU 50 calculates the target steering angle θt of the front wheels 12 required to the automated steering control. As an example, the target steering angle θt can be calculated as follows. That is, based on a detected driving lane, the ECU 50 calculates the radius of curvature of the driving lane, an offset amount of the vehicle 10 with respect to the driving lane (more specifically, the amount of deviation of the center line of the vehicle 10 in a vehicle longitudinal direction with respect to the center line of the driving lane), and a yaw angle.

The ECU 50 calculates the target steering angle θt on the basis of the radius of curvature, the offset amount and the yaw angle that have been calculated. To be more specific, the calculation of the target steering angle θt is, for example, performed as follows. The ECU 50 calculates a lateral acceleration required to cause the vehicle to run along the target path, on the basis of the radius of curvature of a detected driving lane. Moreover, the ECU 50 performs feedback control to calculate a lateral acceleration required to cause the offset amount to approach a target offset amount, on the basis of the difference between a calculated offset amount and a target offset amount that is set in advance. Furthermore, the ECU 50 performs feedback control to calculate a lateral acceleration required to cause the yaw angle to approach a target yaw angle, on the basis of the difference between a calculated yaw angle and a target yaw angle that is set in advance. On that basis, the ECU 50 calculates a target lateral acceleration by adding these three lateral accelerations to each other. The ECU 50 stores a map (not shown) that defines a relationship between input parameters, such as the target lateral acceleration and the vehicle speed V, and the target steering angle θt. The target steering angle θt is calculated, from this kind of map, as a value required to generate the target lateral acceleration for the vehicle 10.

2-2. PID Control

The ECU 50 performs PID control in order to cause the actual steering angle θa to approach the target steering angle θt (that is, in order to cause the actual driving path of the vehicle 10 to follow a target driving path) in the automated steering control.

To be more specific, the ECU 50 calculates an angle difference Δθ [deg] that is a difference between the target steering angle θt and the actual steering angle θa (more specifically, a difference obtained by subtracting the actual steering angle θa from the target steering angle θt, as one example). Also, as shown in FIG. 2, the ECU 50 calculates the proportional term, the integral term and the differential term of the steering control amount by the PID control on the basis of the angle difference Δθ. On that basis, the ECU 50 calculates a final steering control amount (the control amount of the steering torque) by adding these control amounts to each other. In the following description, the proportional term, the integral term and the differential term are respectively referred to as a P control amount, an I control amount and a D control amount.

2-2-1. Characteristics Switching Determination Section 80

The ECU 50 includes a characteristics switching determination section 80 as shown in FIG. 2. The ECU 50 uses a P control amount map 82 for calculation of the P control amount and uses an angle difference adjustment map 84 for calculation of the I control amount. The characteristics switching determination section 80 switches the individual characteristics of the P control amount map 82 and the angle difference adjustment map 84 in accordance with the steering torque Ta inputted to the steering shaft 24 from the driver. In more detail, the characteristics switching determination section 80 determines whether or not a steering intervention of the driver is performed during execution of the automated steering control on the basis of the steering torque Ta, and switches the characteristics of the maps 82 and 84 described above on the basis of the result of this determination.

2-2-2. Calculation of P Control Amount (Proportional Term)

The P control amount map 82 defines a relationship between the P control amount and the angle difference Δθ as shown in FIG. 2. In more detail, FIG. 2 represents the characteristics of the P control amount map 82 in an example in which the angle difference Δθ is positive (that is, an example in which the target steering angle θt is greater than the actual steering angle θa). As shown in FIG. 2, the greater the positive angle difference Δθ is, the greater the positive P control amount becomes. In addition, although the illustration is omitted in FIG. 2, the characteristics of the P control amount map 82 in an example in which the angle difference Δθ is negative (that is, an example in which the actual steering angle θa is greater than the target steering angle θt) is the same as that obtained when the characteristics (solid line and broken line) shown in FIG. 2 are displaced symmetrically with respect to the origin. Thus, the greater the angle difference Δθ is on the negative side, the greater the P control amount becomes on the negative side. Hereinafter, the characteristics of the P control amount is described by taking, as an example, a range in which the angle difference Δθ is positive as shown in FIG. 2.

In the P control amount map 82, a proportional term guard value for providing an upper and lower limits of the P control amount is provided (in FIG. 2, only a proportional term guard value on the side of the upper limit is illustrated). If the P control amount reaches the proportional term guard value during increase of the angle difference Δθ, the P control amount is limited so as not to exceed the proportional term guard value.

The broken line shown in the P control amount map 82 represents the characteristics used when a steering intervention of the driver is not performed during execution of the automated steering control. According to the characteristics, the P control amount increases in association with an increase of the angle difference Δθ in a linear fashion as shown in FIG. 2. Because of this, in the following description, this characteristics shown by the broken line is referred to as a "linear characteristics". In addition, this linear characteristics corresponds to the "first proportional term characteristics" according to the present disclosure.

On the other hand, the solid line shown in the P control amount map 82 represents the characteristics used when a steering intervention of the driver is performed during execution of the automated steering control. An angle difference range R1 in FIG. 2 indicates a range in which the absolute value of the angle difference Δθ is greater than or equal to a threshold value Δθth, and an angle difference range R2 indicates a range in which the absolute value of the angle difference Δθ is small than the threshold value Δθth. According to the characteristics shown by the solid line in the P control amount map 82, as to the angle difference range R2, the P control amount increases in association with an increase of the angle difference Δθ in a linear fashion, as with the linear characteristics described above. However, in the angle difference range R1, the amount of increase of absolute value of the P control amount with respect to the amount of increase of absolute value of the angle difference Δθ is smaller than that in the linear characteristics (broken line). In the following description, this characteristics shown by the solid line is referred to as a "non-linear characteristics". In addition, this non-linear characteristics corresponds to the "second proportional term characteristics" according to the present disclosure. Moreover, the angle difference range R1 corresponds to the "large-angle-difference range" according to the present disclosure, and the angle difference range R2 corresponds to the "small-angle-difference range" according to the present disclosure.

To be more specific, the non-linear characteristics is determined such that, during use of the angle difference range R1 that is greater than or equal to the threshold value Δθth, the amount of increase of absolute value of the P control amount with respect to the amount of increase of absolute value of the angle difference Δθ becomes smaller when the P control amount approaches the proportional term guard value more closely. According to this kind of non-linear characteristics, the amount of increase of absolute value of the P control amount with respect to the amount of increase of absolute value of the angle difference Δθ can be slowed in the vicinity of the proportional term guard value as compared to that when the linear characteristics is used. In further addition to this, according to the non-linear characteristics, the value of the angle difference Δθ obtained when the P control amount reaches the proportional term guard value becomes greater than that in the linear characteristics.

The threshold value Δθth is smaller than an angle difference Δθ1 obtained when the P control amount reaches the proportional term guard value under the linear characteristics. The angle difference range R2 that is smaller than the threshold value Δθ th is a range that is used at a time when the actual steering angle θa is caused to follow the target steering angle θt during execution of the automated steering control (that is, at a time when the actual driving path is caused to follow the target path). In other words, the angle difference range R2 is a range within which the angle difference falls at this time. Because of this, it can be said that the value of the threshold value Δθth is meaningful as un upper limit value that is capable of ensuring the compliance of the actual steering angle θa to the target steering angle θt. It can also be said that the angle difference range R2 is such a small-angle-difference range so as not to be used when the driver steers the steering wheel 22 to change direction of the vehicle 10 on the basis of the intention of the driver. In further addition to this, the P control amount in the angle difference range R2 under the linear characteristics (broken line) is determined so as to have a value that can properly ensure the compliance of the actual steering angle θa with respect to the target steering angle θt.

On the other hand, the angle difference range R1 that is greater than or equal to the threshold value Δθth is used during the steering operation by the driver. Additionally, from the viewpoint of ensuring the compliance described above, the angle difference range R1 is a range which is not scheduled for use when the actual steering angle θa is caused to follow the target steering angle θt in the automated steering control. However, even during execution of the automated steering control, the angle difference range R1 may be used. Examples thereof are when a steering intervention of the driver is performed and when there is some sort of disturbance (for example, when the vehicle 10 is in a strong crosswind).

A situation is herein assumed in which the P control amount reaches the proportional term guard value as a result of a steering intervention of the driver being performed during execution of the automated steering control (that is, during driving of the EPS device 40 based on the steering control amount including the P control amount in order to ensure the compliance of the actual steering angle θa with respect to the target steering angle θt). If the linear characteristics (broken line) is used under this situation, the P control amount reaches the proportional term guard value in a condition in which the amount of increase of absolute value of the P control amount with respect to the amount of increase of absolute value of the angle difference Δθ is high, and, as a result, an increase of the P control amount is limited. As a result, a rapid change of the P control amount occurs. If the control amount rapidly changes in this way, there is a concern that the driver may get a feeling of strangeness with respect to the operation of the steering wheel 22.

Accordingly, the characteristics switching determination section 80 turns ON a characteristics switching flag when it determines that a steering intervention of the driver is performed on the basis of the steering torque Ta. When the characteristics switching flag is ON, the ECU 50 calculates the P control amount according to the angle difference Δθ by the use of the non-linear characteristics of the P control amount map 82.

The characteristics switching determination section 80 turns OFF the characteristics switching flag when it determines that a steering intervention of the driver is not performed on the basis of the steering torque Ta. When the characteristics switching flag is OFF, the ECU 50 calculates the P control amount according to the angle difference Δθ by the use of the linear characteristics of the P control amount map 82.

2-2-3. Calculation of I Control Amount (Integral Term)

An integrator 86 of the ECU 50 integrates the angle difference Δθ with respect to time to calculate an integral value of the angle difference Δθ. In more detail, the integrator 86 calculates an integral value of the angle difference Δθ by repeatedly executing the processing to add the previous value of the angle difference Δθ to the current value (the latest value) of the angle difference Δθ. The ECU 50 also calculates an I control amount of the steering control amount by multiplying the integral value of the angle difference Δθ by a certain integral gain Ki. An upper and lower limit guard section 88 limits the I control amount, depending on the magnitude of the I control amount, so as to fall within a predetermined range, in order not to cause a calculation value of the I control amount to be extremely too large.

In the present embodiment, the manners of calculation of the integral value of the angle difference $\Delta\theta$ at the integrator 86 are different from each other depending on whether the characteristics switching flag that is set by the characteristics switching determination section 80 is ON or OFF. In detail, the integrator 86 does not always add, to the previous value, the current value of the angle difference $\Delta\theta$ as it is, and adds, to the previous value, a value obtained by multiplying the current value by a coefficient C. Moreover, the characteristics of the coefficient C with respect to the angle difference $\Delta\theta$ is changed in accordance with ON/OFF of the characteristics switching flag.

The ECU 50 uses the angle difference adjustment map 84 shown in FIG. 2 to calculate the coefficient C as a value according to the current value of the angle difference $\Delta\theta$. The following description regarding the characteristics of the coefficient C of the angle difference adjustment map 84 is made by taking, as an example, the range in which the angle difference $\Delta\theta$ is positive, as with the description described above for the P control amount map 82 shown in FIG. 2. In addition, the characteristics of the coefficient C in the range in which the angle difference $\Delta\theta$ is negative is line-symmetric to the characteristics of the coefficient C in the range in which the angle difference $\Delta\theta$ is positive, by using, as an axis of symmetry, the axis (the vertical axis) of the coefficient C at a position where the angle difference $\Delta\theta$ is zero.

The broken line shown in the angle difference adjustment map 84 represents the characteristics used when the characteristics switching flag is OFF (that is, when a steering intervention of the driver is not performed during execution of the automated steering control). According to the characteristics shown by this broken line, the value of the coefficient C is constant at 1 regardless of the angle difference $\Delta\theta$ as shown in FIG. 2.

The solid line shown in the angle difference adjustment map 84 represents the characteristics used when the characteristics switching flag is ON (that is, when a steering intervention of the driver is performed during execution of the automated steering control). According to the characteristics shown by this solid line, the value of the coefficient C in the angle difference range R2 that is smaller than the threshold value $\Delta\theta$th is also constant at 1 as with the characteristics shown by the broken line described above. On the other hand, as shown in FIG. 2, the value of the coefficient C in the angle difference range R1 that is greater than or equal to the threshold value $\Delta\theta$th is determined so as to approach zero more closely when the angle difference $\Delta\theta$ is greater. In more detail, in this example, the coefficient C is determined so as to decrease in a linear function manner when the angle difference $\Delta\theta$ is greater.

If 1 is used as the coefficient C, the current value of the angle difference $\Delta\theta$ as it is, is added to the previous value without change. On the other hand, if a value that is greater than zero and smaller than 1 is used as the coefficient C, the current value of the angle difference $\Delta\theta$ that has been decreased by the coefficient C is added to the previous value. In addition, the characteristics of the I control amount calculated using the coefficient C according to the characteristics shown by the broken line in FIG. 2 corresponds to the "first integral term characteristics" according to the present disclosure, and the characteristics of the I control amount calculated using the coefficient C according to the characteristics shown by the solid line in the same drawing corresponds to the "second integral term characteristics" according to the present disclosure.

Figure 3:
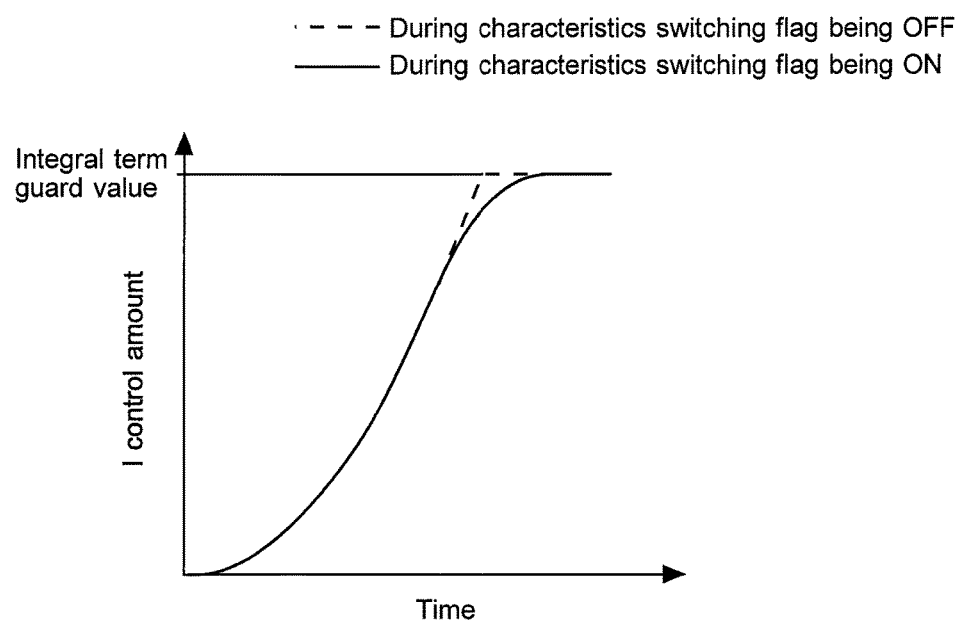
FIG. 3 is a graph that illustrates the difference of time change characteristics of an I control amount due to the difference of the characteristics of a coefficient C in a state in which an angle difference range R1 is used.

FIG. 3 is a graph that illustrates the difference of time change characteristics of the I control amount due to the difference of the characteristics of the coefficient C in a state in which the angle difference range R1 is used. The waveform shown by the broken line in FIG. 3 corresponds to when the coefficient C according to the characteristics shown by the broke line in the angle difference adjustment map 84 is used, and the waveform shown by the solid line in the same drawing corresponds to when the coefficient C according to the characteristics shown by the solid line in the angle difference adjustment map 84 is used.

According to the characteristics shown by the solid line in the angle difference adjustment map 84, the value of the coefficient C in the angle difference range R1 that is greater than or equal to the threshold value $\Delta\theta$th is determined, as described above, so as to approach zero more closely when the angle difference $\Delta\theta$ is greater. Thus, when the angle difference range R1 is used as a result of a steering intervention of the driver being performed, the current value of the angle difference $\Delta\theta$ that is added to the previous value can be gradually decreased with a lapse of time. As a result, according to the waveform shown by the solid line in FIG. 3, a time change of the I control amount can be slowed in the vicinity of the integral term guard value as compared to the waveform shown by the broken line.

2-2-4. Calculation of D Control Amount (Differential Term)

The ECU 50 differentiates the angle difference $\Delta\theta$ with respect to time at a differentiator 90 to calculate a differential value of the angle difference $\Delta\theta$. The ECU 50 also calculates a D control amount of the steering control amount by multiplying the differential value of the angle difference $\Delta\theta$ by a certain differential gain Kd. As with the I control amount, an upper and lower limit guard section 92 also limits the D control amount, depending on the magnitude of the D control amount, so as to fall within a predetermined range, in order not to cause a calculation value of the D control amount to be extremely too large.

2-2-5. Calculation of Final Steering Control Amount

The ECU 50 calculates a final steering control amount by adding the P control amount, the I control amount and the D control amount of the steering control amount calculated as described above to each other. On that basis, the ECU 50 calculates a target electric current command value according to the final steering control amount (i.e., the control amount of the steering torque) and outputs a calculated target electric current command value to the EPS driver 44 to drive the electric motor 42 of the EPS device 40. As a result, the actual steering angle $\theta$a of the front wheels 12 is controlled so as to be the target steering angle $\theta$t by the automated steering function with the EPS device 40. In more detail, feedback control is performed to cause the actual steering angle $\theta$a of the front wheels 12 to approach the target steering angle $\theta$t. In addition, the D control amount may not be always used, as far as the control amount of the steering torque for causing the actual steering angle $\theta$a of the front wheels 12 to approach the target steering angle $\theta$t includes at least the P control amount and the I control amount.

3. Processing Related to Automated Steering Control

Figure 4:
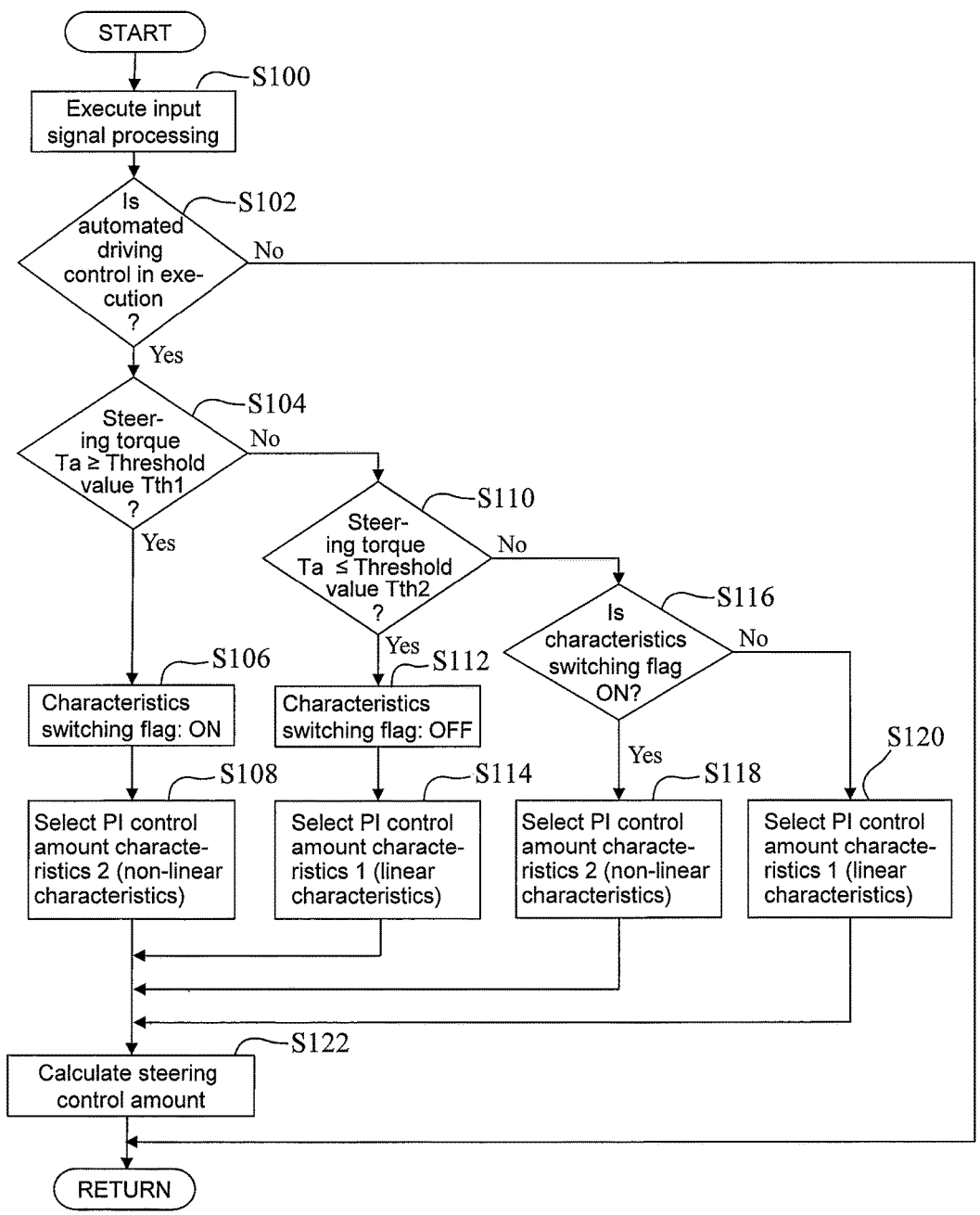
FIG. 4 is a flow chart that shows a routine of characteristic processing related to the automated steering control according to the first embodiment of the present disclosure.

FIG. 4 is a flow chart that shows a routine of characteristic processing related to the automated steering control according to the first embodiment of the present disclosure. The present routine focuses on the processing regarding the automated steering control to be performed during traveling of the vehicle 10. The processing of the present routine is repeatedly performed at a predetermined interval during traveling of the vehicle 10.

First, the ECU 50 executes an input signal processing (step S100). More specifically, the ECU 50 acquires various sensor signals, the driving environment information from the driving environment detection device 70, and a signal from the selection switch 72. The various sensor signals is exemplified by the steering torque signal, the steering angle signal and the vehicle speed signal that are inputted from the various sensors, such as the steering torque sensor 60 connected to the ECU 50. In step S100, the ECU 50 also calculates the target steering angle θt.

Next, the ECU 50 determines whether or not the automated driving control is in execution (step S102). When the selection switch 72 is turned ON by the driver, the ECU 50 executes the automated driving control including the automated steering control, as far as predetermined execution requirements are met. If the automated driving control is in execution, the ECU 50 turns ON a flag that indicates that the automated driving control is in execution. If, on the other hand, the automated driving control is not in execution, the ECU 50 turns OFF the flag. In this step S102, it is determined whether or not the automated driving control is in execution, on the basis of the status of this kind of flag. If, as a result, the ECU 50 determines in step S102 that the automated driving control is not in execution, it promptly ends the processing of the routine currently in progress. In addition, if the automated driving control is not in execution as just described, the steering torque assist control is performed.

If, on the other hand, the ECU 50 determines that the automated driving control (including the automated steering control) is in execution in step S102, it determines whether or not the absolute value of the steering torque Ta applied to the steering wheel 22 by the driver is greater than or equal to a threshold value Tth1 (step S104). The threshold value Tth1 is determined in advance as a value for determining whether or not a steering operation by the driver is performed. In addition, this threshold value Tth1 corresponds to the "first threshold value" according to the present disclosure.

If the determination result of step S104 is positive (steering torque Ta≥threshold value Tth1), that is, if it can be judged that a steering intervention of the driver is performed during execution of the automated steering control, the ECU 50 (the characteristics switching determination section 80) turns ON the characteristics switching flag (step S106). Moreover, if determination result of step S104 is positive, the ECU 50 selects a PI control amount characteristics 2 (step S108). This PI control amount characteristics 2 corresponds to a combination of the non-linear characteristics of the P control amount and the characteristics of the I control amount based on the characteristics of the coefficient C shown by the solid line in FIG. 2.

If the determination result of step S104 is negative (steering torque Ta≤threshold value Tth1), the ECU 50 then determines whether or not the steering torque Ta is smaller than or equal to a threshold value Tth2 (step S110). This threshold value Tth2 is a value that is smaller than the aforementioned threshold value Tth1 and is used for providing a hysteresis to switching of ON/OFF of the characteristics switching flag. In addition, this threshold value Tth2 corresponds to the "second threshold value" according to the present disclosure.

If the determination result of step S110 is positive (steering torque Ta≤threshold value Tth2), the ECU 50 turns OFF the characteristics switching flag (step S112) and selects a PI control amount characteristics 1 (step S114). This PI control amount characteristics 1 corresponds to a combination of the linear characteristics of the P control amount and the characteristics of the I control amount based on the characteristics of the coefficient C shown by the broken line in FIG. 2.

If the determination result of step S110 is negative (threshold value Tth2<steering torque Ta<threshold value Tth1), the ECU 50 then determines whether or not the characteristics switching flag is ON (step S116).

If the ECU 50 determines in step S116 that the characteristics switching flag is ON, it selects the PI control amount characteristics 2 (step S118). If, on the other hand, the ECU 50 determines that the characteristics switching flag is OFF, it selects the PI control amount characteristics 1 (step S120).

The ECU 50 calculates the steering control amount of the automated steering control after the processing of the step S108, S114, S118 or S120 is performed (step S122). In detail, in accordance with a selected PI control amount characteristics 1 or 2, the ECU 50 calculates the P control amount and the I control amount that are according to the angle difference Δθ. The ECU 50 also calculates the D control amount according to the angle difference Δθ. On that basis, the ECU 50 calculates a final steering control amount by adding these control amounts to each other. In addition, the ECU 50 actuates the EPS device 40 such that the steering torque according to a calculated final steering control amount is generated by the electric motor 42.

[Advantageous Effects of First Embodiment]

According to the present embodiment described so far, the characteristics of the P control amount map 82 and the angle difference adjustment map 84 that are respectively used for calculation of the P control amount and the I control amount are switched in accordance with whether or not a steering intervention of the driver is performed during execution of the automated steering control.

In detail, when a steering intervention of the driver is performed, the P control amount is determined by the use of the non-linear characteristics of the P control amount map 82. According to the non-linear characteristics, the amount of increase of absolute value of the P control amount with respect to the amount of increase of absolute value of the angle difference Δθ can be slowed in the vicinity of the proportional term guard value as compared to that when the linear characteristics is used. Thus, a rapid change of the P control amount can be prevented from occurring in the vicinity of the proportional term guard value when a steering intervention of the driver is performed. Moreover, when a steering intervention of the driver is performed, the I control amount is calculated with the coefficient C according to the characteristics shown by the solid line (see FIG. 2) in the angle difference adjustment map 84. As already described with reference to FIG. 3, according to this characteristics shown by the solid line, a time change of the I control amount can be slowed in the vicinity of the integral term guard value, as compared to that when the characteristics shown by the broken line is used. In the present embodiment, the steering control amount (the control amount of the steering torque) including the P control amount and the I control amount that are calculated as described so far is calculated. Therefore, when a steering intervention of the driver is performed, a rapid change of the control amount of the steering torque by the automated steering control can be prevented from occurring. Consequently, even if the steering control amount reaches the guard value thereof, a feeling of strangeness of the driver with respect to the operation of the steering wheel 22 can be reduced.

Moreover, there is the possibility that, during execution of the automated steering control, the angle difference Δθ may increase due to some sort of disturbance (for example, that the vehicle is in a crosswind) even if there is no steering intervention of the driver, and that the angle difference range R1 may be used. In this regard, if a steering intervention of the driver is not performed, the P control amount is calculated by the use of the linear characteristics of the P control amount map 82, and the I control amount is calculated with the coefficient C according to the characteristics shown by the broken line (see FIG. 2) in the angle difference adjustment map 84. According to these characteristics, when the angle difference range R1 is used without a steering intervention of the driver, greater absolute values of the P control amount and the I control amount according to the same angle difference Δθ can be ensured as compared to those when a steering intervention of the driver is performed. Thus, even if the angle difference Δθ increases due to a disturbance, the compliance of the actual steering angle θa with respect to target steering angle θt can be easy to be properly ensured. Consequently, when a steering intervention of the driver is performed, a rapid change of the control amount of the steering torque by the automated steering control can be prevented from occurring while enhancing robustness of the automated steering control with respect to a disturbance.

Furthermore, according to the present embodiment, a hysteresis is provided with respect to switching of ON/OFF of the characteristics switching flag (that is, switching of the individual characteristics of the P control amount map 82 and the angle difference adjustment map 84) as represented in the processing of steps S104 to S120 of the routine shown in FIG. 4. In the automated steering control described above, this kind of hysteresis is not necessarily required, and switching may thus be made between the PI control amount characteristics 1 and 2 on the basis of the absolute value of the steering torque Ta is greater than or equal to a single threshold value. However, providing a hysteresis as in the routine shown in FIG. 4 has the following advantages. That is, in returning the position of the steering wheel 22 to the neutral point while the driver decreases the steering torque Ta at the time of a steering intervention of the driver ending, hunting can be prevented from occurring at the switching of the characteristics.

Additionally, in the first embodiment described above, the P control amount depending on the angle difference Δθ is determined by the use of the P control amount map 82 that defines the relationship between the angle difference Δθ and the P control amount. However, an alternative method of determining the P control amount according to the angle difference Δθ may be used, as far as the following requirements are met. That is, an alternative method may be used, as far as the P control amount calculated during use of the angle difference range R1 that is greater than or equal to the threshold value Δθth is determined such that, when a steering intervention of the driver is performed, the amount of increase of absolute value of the P control amount with respect to the amount of increase of absolute value of the angle difference Δθ becomes smaller than that when the steering intervention is not performed. Thus, the P control amount according to the angle difference Δθ may also be determined, for example, by the use of a calculation method described below with reference to FIG. 5.

Figure 5:
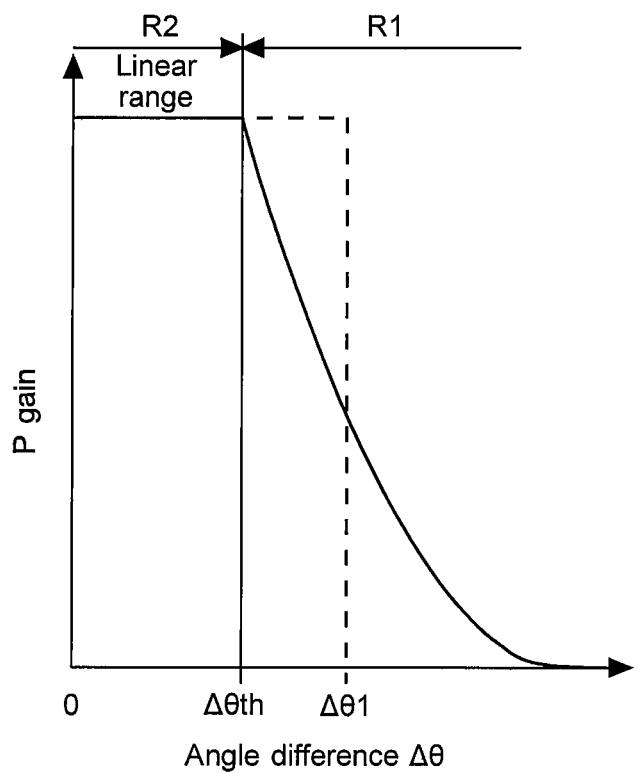
FIG. 5 is a graph that illustrates a relationship between a P gain (a proportional term gain) and an angle difference Δθ.

FIG. 5 is a graph that illustrates a relationship between a P gain (a proportional term gain) and the angle difference Δθ. The characteristics shown by the solid line in FIG. 5 is used when a steering intervention of the driver is performed during execution of the automated steering control. The characteristics shown by the broken line in the same drawing is used when a steering intervention of the driver is not performed. In addition, as with the above description concerning the P control amount map 82 in FIG. 2, the characteristics of the P gain is described with reference to FIG. 5 by taking an example of a range in which the angle difference Δθ is positive. The characteristics of the P gain in a range in which the angle difference Δθ is negative is line-symmetric to the characteristics of the P gain in the range in which the angle difference Δθ is positive, by using, as an axis of symmetry, the axis of the P gain (the vertical axis of FIG. 5) at a position where the angle difference Δθ is zero.

According to the characteristics shown by the broken line in FIG. 5, the value of the P gain in an angle difference range until the angle difference Δθ reaches the angle difference Δθ1 (which corresponds to the proportional term guard value of the P control amount) is constant. This constant value is determined so as to properly ensure the compliance of the actual steering angle θa with respect to the target steering angle θt during execution of the automated steering control. Also, with the use of the P gain of this constant value, the linear characteristics of the P control amount is obtained.

According to the characteristics shown by the solid line in FIG. 5, the angle difference range R2 that is smaller than the threshold value Δθth is a linear range of the P control amount, and the P gain of this angle difference range R2 is a constant value that is the same as that when the characteristics shown by the broken line is used. On the other hand, in the angle difference range R1 that is greater than or equal to the threshold value Δθth, the P gain is determined so as to decrease according to a quadratic function in association with an increase of the angle difference Δθ. With the P control amount being calculated by multiplying the angle difference Δθ by the P gain determined in this way, the P control amount can be determined while the requirements described above are met, as in when the P control amount map 82 is used.

In addition, in reference to FIG. 5, the P gain in the angle difference range R1 may also be determined so as to decrease according to a linear function, or a cubic or higher-order function in association with an increase of the angle difference Δθ, instead of a quadratic function. Also, the P gain having this kind of characteristics may be similarly determined using a map that defines a relationship between the angle difference Δθ and the P gain, instead of the use of an arbitrary order function. Moreover, if the P control amount is determined directly from the angle difference Δθ, the P control amount according to the angle difference Δθ may also be calculated, for example, using an arbitrary order function, instead of the P control amount map 82 described above.

Furthermore, the coefficient C used for the calculation of the I control amount may be determined so as to approach zero more closely when the angle difference Δθ is greater. That is, the coefficient C may also be calculated as a value according to the angle difference Δθ by the use of a linear function, a quadratic function or a cubic or higher-order function, instead of the use of the angle difference adjustment map 84 shown in FIG. 2.

Second Embodiment

Next, a second embodiment according to the present disclosure will be described with reference to FIG. 6. It is assumed that, in the following description, the driver assistance system according to the second embodiment is applied to, for example, the vehicle 10 having the configuration shown in FIG. 1, as with the driver assistance system according to the first embodiment.

[Steering Control According to Second Embodiment]

Figure 6:
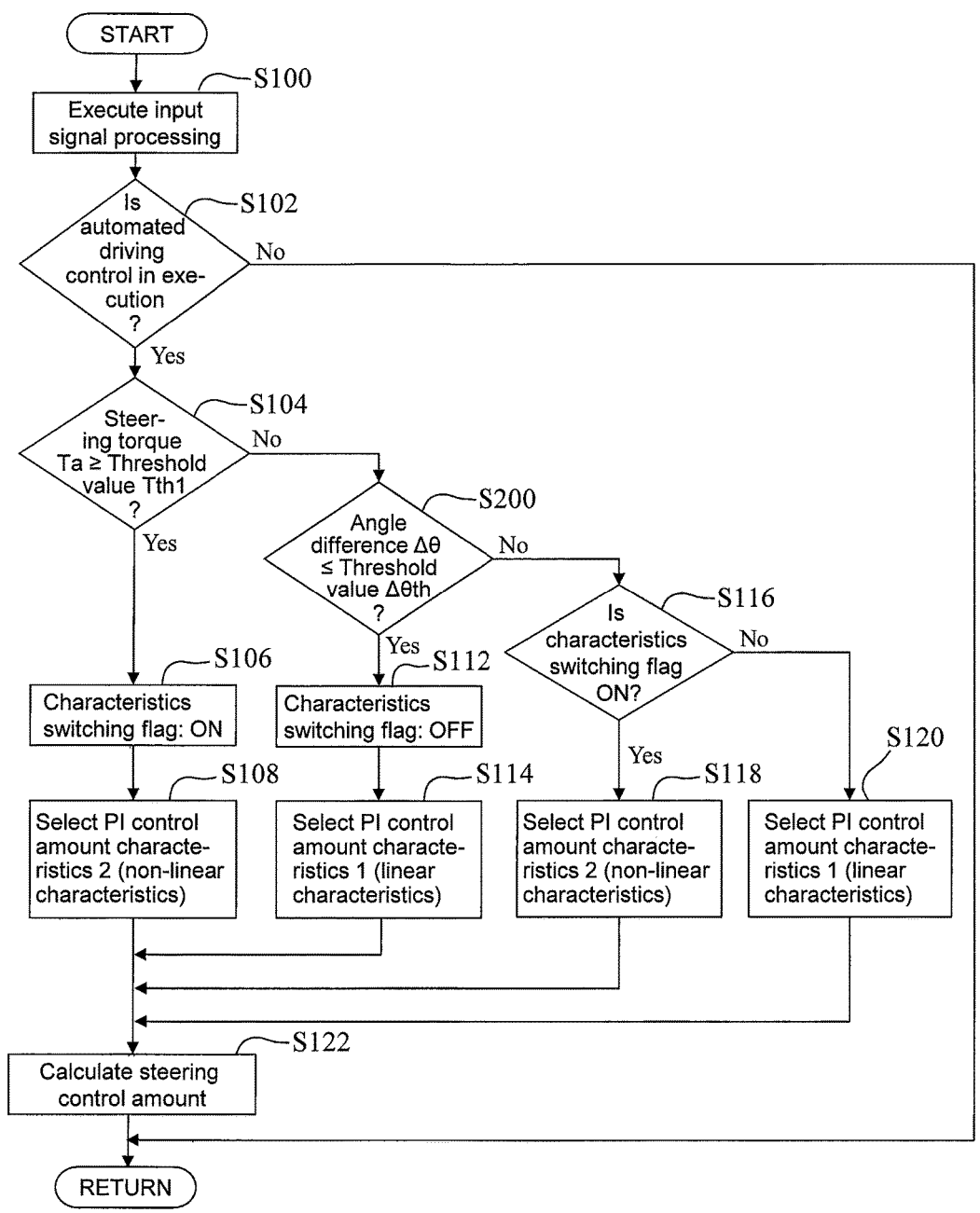
FIG. 6 is a flow chart that shows a routine of characteristic processing related to automated steering control according to a second embodiment of the present disclosure.

The steering control according to the present embodiment is basically the same as the steering control according to the first embodiment, except that the following routine shown in FIG. 6 is used instead of the routine shown in FIG. 4.

In the first embodiment described above, if the steering torque Ta is smaller than or equal to the threshold value Tth2, the PI control amount characteristics 2 is changed to the PI control amount characteristics 1. In contrast to this, in the present embodiment, if the absolute value of the angle difference Δθ is smaller than or equal to the threshold value Δθth, the PI control amount characteristics 2 is changed to the PI control amount characteristics 1. In this regard, in the first embodiment, only the steering torque Ta is inputted to the characteristics switching determination section 80 (see FIG. 2), and, on the other hand, in the present embodiment, the angle difference Δθ is inputted to the characteristics switching determination section 80 as well as the steering torque Ta.

FIG. 6 is a flow chart that shows a routine of characteristic processing related to the automated steering control according to the second embodiment of the present disclosure. The processing of steps S100 to 108, and S112 to S122 in the routine shown in FIG. 6 is as already described in the first embodiment.

In the routine shown in FIG. 6, if the determination result of the step S104 is negative (steering torque Ta≤threshold value Tth1), the ECU 50 then determines whether or not the absolute value of the angle difference Δθ is smaller than or equal to the threshold value Δθth described above (step S200).

If the determination result of the step S200 is positive (absolute value of angle difference Δθ≤threshold value Δθth), the ECU 50 turns OFF the characteristics switching flag (step S112) and selects the PI control amount characteristics 1 (step S114).

If, on the other hand, the determination result of the step S200 is negative (absolute value of angle difference Δθ>threshold value Δθth), the ECU 50 proceeds to step S116.

[Advantageous Effects of Second Embodiment]

According to the routine shown in FIG. 6 described so far, reverting to the PI control amount characteristics 1 from the PI control amount characteristics 2 is performed when the angle difference Δθ becomes smaller than or equal to the threshold value Δθth (that is, when the angle difference range R2 is used) after a steering intervention of the driver is performed. In the angle difference range R2, the characteristics of both of the P control amount and the I control amount with respect to the angle difference Δθ are equal to each other regardless of ON/OFF of the characteristics switching flag (that is, regardless of the presence or absence of a steering intervention of the driver). Thus, by causing the PI control amount characteristics 2 to revert to the PI control amount characteristics 1 in the angle difference range R2, the reverting can be performed while preventing changes of the P control amount and the I control amount that accompanies the switching of the characteristics.

Furthermore, as described above, the angle difference range R2 is such a small-angle-difference range that it is not used when a steering operation by the driver is performed to change the direction of the vehicle 10 on the basis of an intention of the driver. According to the routine described above, even if the steering torque Ta falls below the threshold value Tth1 at the time of a steering intervention of the driver ending, the switching to the PI control amount characteristics 1 is not performed immediately and is performed after the angle difference Δθ enters the angle difference range R2. Thus, according to the method of the present embodiment, in returning the position of the steering wheel 22 to the neutral point while the driver decreases the steering torque Ta at the time of a steering intervention of the driver ending, hunting can also be prevented from occurring at the switching of the characteristics.

Additionally, in the first and second embodiments described above, the example has been described in which the characteristics of both of the P control amount and the I control amount are switched in accordance with ON/OFF of the characteristics switching flag (that is, in accordance with the presence or absence of a steering intervention of the driver during execution of the automated steering control). With the characteristics of both of the P control amount and the I control amount being changed as described above, a rapid change of the control amount of the steering torque can be reduced more effectively when a steering intervention of the driver is performed. However, the switching of the characteristics of the control amount depending on the presence or absence of a steering intervention of the driver may not be always performed for both of the P control amount and the I control amount. Alternatively, only a switching of the characteristics of any one of the P control amount and the I control amount may be performed.

What is claimed is:

1. A driver assistance system for a vehicle,
    the vehicle including an electric power steering device equipped with an electric motor that is driven to control a steering angle of a wheel,
    wherein the driver assistance system is configured to perform automated steering control that controls the electric motor so as to generate a steering torque for causing an actual steering angle of the wheel to approach a target steering angle,
    wherein a control amount of the steering torque used for causing the actual steering angle to approach the target steering angle in the automated steering control includes a proportional term based on an angle difference between the target steering angle and the actual steering angle and an integral term based on an integral value of the angle difference,
    wherein the driver assistance system is configured, when a steering intervention of the driver is not performed during the automated steering control, to perform determination of the proportional term based on a first proportional term characteristics and calculation of the integral term based on a first integral term characteristics,
    wherein, in the first proportional term characteristics, the proportional term is determined such that, within a range that does not exceed a proportional term guard value, an absolute value of the proportional term becomes greater when an absolute value of the angle difference is greater,
    wherein the integral term based on the first integral term characteristics is calculated based on the integral value calculated without correction of a current value of the angle difference within a range that does not exceed an integral term guard value,
    wherein the driver assistance system is configured, when a steering intervention of the driver is performed during the automated steering control, to perform at least one of determination of the proportional term based on a second proportional term characteristics used instead of the first proportional term characteristics and calculation of the integral term based on a second integral term characteristics used instead of the first integral term characteristics, wherein, in a large-angle-difference range in which the absolute value of the angle difference is greater than or equal to an angle difference threshold value, the proportional term based on the second proportional term characteristics is determined such that, within a range that does not exceed the proportional term guard value, an amount of increase of the absolute value of the proportional term with respect to an amount of increase of the absolute value of the angle difference becomes smaller than that of the proportional term based on the first proportional term characteristics, and wherein, within a range that does not exceed the integral term guard value, the integral term based on the second integral term characteristics is calculated based on the integral value calculated while multiplying the current value of the angle difference by a coefficient, the coefficient indicating 1 in a small-angle-difference range in which the absolute value of the angle difference is smaller than the angle difference threshold value and approaching zero when the absolute value of the angle difference is greater in the large-angle-difference range.

2. The driver assistance system according to claim 1, wherein the driver assistance system is configured to:

select the second proportional term characteristics when an absolute value of a steering torque applied to a steering wheel by the driver increases so as to be greater than or equal to a first threshold value (Tth1) during the automated steering control; and select the first proportional term characteristics when the absolute value of the steering torque applied to the steering wheel by the driver decreases so as to be smaller than or equal to a second threshold value (Tth2) that is smaller than the first threshold value during the automated steering control.

3. The driver assistance system according to claim 1, wherein the driver assistance system is configured to:

select the second proportional term characteristics when an absolute value of a steering torque applied to a steering wheel by the driver increases so as to be greater than or equal to a first threshold value during the automated steering control; and select the first proportional term characteristics when the absolute value of the angle difference transitions from the large-angle-difference range to the small-angle-difference range during the automated steering control.

4. The driver assistance system according to claim 1, wherein the driver assistance system is configured to:

select the second integral term characteristics when an absolute value of a steering torque applied to a steering wheel by the driver increases so as to be greater than or equal to a first threshold value during the automated steering control; and select the first integral term characteristics when the absolute value of the steering torque applied to the steering wheel by the driver decreases so as to be smaller than or equal to a second threshold value that is smaller than the first threshold value during the automated steering control.

5. The driver assistance system according to claim 1, wherein the driver assistance system is configured to:

select the second integral term characteristics when an absolute value of a steering torque applied to a steering wheel by the driver increases so as to be greater than or equal to a first threshold value during the automated steering control; and select the first integral term characteristics when the absolute value of the angle difference transitions from the large-angle-difference range to the small-angle-difference range during the automated steering control.

* * * * *